(12) United States Patent
Griswold et al.

(10) Patent No.: US 6,616,115 B1
(45) Date of Patent: Sep. 9, 2003

(54) GIMBALED FLYWHEEL SYSTEM

(75) Inventors: Ray F. Griswold, Phoenix, AZ (US); John V. Coyner, Jr., Littleton, CO (US)

(73) Assignee: AFS Trinity Power Corporation, Medina, WA (US)

( * ) Notice: Subject to any disclaimer, the term of this patent is extended or adjusted under 35 U.S.C. 154(b) by 0 days.

(21) Appl. No.: 09/943,100

(22) Filed: Aug. 30, 2001

(51) Int. Cl.$^7$ .............................................. F16M 13/00
(52) U.S. Cl. ........................................ 248/562; 310/74
(58) Field of Search ................................ 248/694, 562; 74/572, 573, 574, 5.34; 310/74

(56) References Cited

U.S. PATENT DOCUMENTS

| | | | | |
|---|---|---|---|---|
| 1,940,387 A | * | 12/1933 | Boykow ...................... | 33/204 |
| 1,973,042 A | * | 9/1934 | Boykow ...................... | 33/204 |
| 2,603,003 A | * | 7/1952 | Braddon ...................... | 33/222 |
| 2,845,800 A | * | 8/1958 | Holmes ...................... | 74/5.34 |
| 2,969,681 A | * | 1/1961 | Beasley ...................... | 74/5.4 |
| 3,004,437 A | * | 12/1961 | Pittman ...................... | 74/5.34 |
| 3,069,912 A | * | 12/1962 | Faux ...................... | 74/5.34 |
| 3,158,340 A | * | 11/1964 | Sellers ...................... | 244/79 |
| 3,280,644 A | * | 10/1966 | Vold ...................... | 74/5.34 |
| 3,355,954 A | * | 12/1967 | Levine ...................... | 74/5.34 |
| 3,451,275 A | * | 6/1969 | Atkin ...................... | 74/5.34 |
| 3,552,216 A | * | 1/1971 | Pasquet ...................... | 74/5.34 |
| 4,387,513 A | * | 6/1983 | Cowdin ...................... | 33/322 |

* cited by examiner

*Primary Examiner*—Leslie A. Braun
*Assistant Examiner*—Kofi Schulterbrandt
(74) *Attorney, Agent, or Firm*—Woodcock Washburn LLP

(57) ABSTRACT

A presently-preferred embodiment of a gimbaled flywheel system mountable on a supporting surface comprises a first and a second pivot each being adapted to be mounted on the supporting surface. The gimbaled flywheel system also comprises a mounting frame comprising a first frame member coupled to the first pivot, an opposing second frame member coupled to the second pivot, and a third and an opposing fourth frame member each being fixedly coupled to the first and the second frame members. The gimbaled flywheel system further comprises a plurality of flywheel units each comprising a casing pivotally coupled to the third and the fourth frame members, and a flywheel rotatably coupled to the casing.

29 Claims, 3 Drawing Sheets

GIMBALED FLYWHEEL SYSTEM

FIELD OF THE INVENTION

The present invention relates to flywheel systems. More specifically, the invention relates to a flywheel system having a plurality of flywheel power units suspended from a common mounting frame in a manner that permits the flywheel power units to gimbal in relation to a surface upon which the flywheel system is mounted.

BACKGROUND OF THE INVENTION

A typical flywheel unit comprises a relatively heavy rotatable mass, or flywheel, suspended from a shaft. The shaft is rotatably coupled to a casing via one or more bearings. Flywheel units have been proposed for use in mobile applications, e.g., as energy-storage units that assist in the acceleration and deceleration of a motor vehicle, or as batteries that convert mechanical energy stored in the flywheel into electrical energy using a motorgenerator incorporated into the flywheel unit.

The proposed use of flywheel units in mobile applications raises certain issues not present in stationary applications. In particular, the rotating flywheel generates gyroscopic moments when the flywheel unit undergoes angular displacement about any axis other than its axis of rotation. These gyroscopic moments can induce substantial forces on the bearings within the flywheel unit, and on the mounts that support and restrain the flywheel unit. Gyroscopic moments can thereby increase friction and wear in mechanical bearings, and can increase the power requirements of electromagnetic bearings. The increases in friction or power requirements increase the rate at which the energy stored in the rotating flywheel is drained, thus lowering the useful energy-storage capacity of the flywheel unit.

The effects of gyroscopic moments in a flywheel unit can be alleviated by suspending the flywheel unit in a manner that permits the unit to freely incline in relation to its supporting surface, i.e., by gimbaling the flywheel unit. Gimbaled mounts, however, present certain disadvantages in comparison to rigid mounts. For example, gimbaled mounts typically occupy a greater volume than rigid mounts. In addition, gimbaled mounts usually have a higher parts count than rigid mounts, and include moving components. Hence, a gimbaled mount is typically heavier, more costly, more complex, and less reliable than a rigid mount of comparable capacity (these characteristics are particularly disadvantageous in mobile applications.)

The disadvantages associated with gimbaled mounts may be outweighed by the benefits of such mounts in applications that involve a single flywheel unit. The disadvantages of gimbaled mounts can easily exceed their resultant benefits, however, in applications involving multiple flywheel units. Hence, an ongoing need exists for a flywheel system having multiple flywheel units mounted in an arrangement that alleviates the effects of gyroscopic moments on the flywheel units and their corresponding mounts, while avoiding the above-noted disadvantages usually associated with multiple gimbaled mounts.

SUMMARY OF THE INVENTION

A presently-preferred embodiment of a gimbaled flywheel system adapted for use on a supporting surface comprises a pivot adapted to be mounted on the supporting surface. The gimbaled flywheel system also comprises a mounting frame comprising a first frame member coupled to the pivot and extending in a first direction, and a second frame member fixedly coupled to the first frame member and extending in a second direction substantially perpendicular to the first direction. The mounting frame is pivotable about an axis extending substantially in the second direction when the pivot is mounted on the supporting surface.

The gimbaled flywheel system further comprises a plurality of flywheel units. The flywheel units each comprise a casing pivotally coupled to the second frame member and being pivotable about a respective axis extending substantially in the first direction, and a flywheel rotatably coupled to the casing and being rotatable about a respective axis extending substantially in a third direction, the third direction being substantially perpendicular to the first direction.

A presently-preferred embodiment of a gimbaled flywheel system mountable on a supporting surface comprises a first and a second pivot each being adapted to be mounted on the supporting surface. The gimbaled flywheel system also comprises a mounting frame comprising a first frame member coupled to the first pivot, an opposing second frame member coupled to the second pivot, and a third and an opposing fourth frame member each being fixedly coupled to the first and the second frame members. The gimbaled flywheel system further comprises a plurality of flywheel units each comprising a casing pivotally coupled to the third and the fourth frame members, and a flywheel rotatably coupled to the casing.

A presently-preferred embodiment of a gimbaled flywheel system adapted for use on a mounting surface comprises a pivot adapted to be mounted on the mounting surface. The gimbaled flywheel system further comprises a mounting frame comprising a first frame member coupled to the pivot, and a second frame member fixed to the first frame member. The gimbaled flywheel system also comprises a plurality of flywheel units each comprising a casing pivotally coupled to the second frame member and having a pivotal axis, and a flywheel rotatably coupled to the casing and having an axis of rotation substantially perpendicular to the pivotal axis.

A presently-preferred embodiment of a power-storage system comprises a first and a second pivot each adapted to be fixedly coupled to a mounting surface. The power-storage system further comprises a mounting frame comprising a first frame member coupled to the first pivot, an opposing second frame member coupled to the second pivot, and a third and an opposing fourth frame member each being fixedly coupled to the first and the second frame members. The mounting frame is pivotable about an axis extending in a first direction.

The power-storage system further comprises a plurality of flywheel units each comprising a casing pivotally coupled to the third and the fourth frame members and being pivotable about a respective axis extending substantially in a second direction, and a flywheel rotatably coupled to the casing and being rotatable about an axis extending substantially in a third direction.

A presently-preferred method of mounting a plurality of flywheel units on a supporting surface comprises pivotally coupling an casing of each of the plurality of flywheel units to a mounting frame, and pivotally coupling the mounting frame to the supporting surface.

BRIEF DESCRIPTION OF THE DRAWING

For the purpose of illustrating the invention, the drawings show an embodiment that is presently preferred. The invention is not limited, however, to the specific instrumentalities disclosed in the drawings. In the drawings.

DESCRIPTION OF PREFERRED EMBODIMENTS

Figure 1:
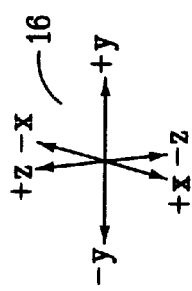
FIG. 1 is a perspective view of a presently-preferred embodiment of a gimbaled flywheel system in accordance with the present invention.
Figure 1:
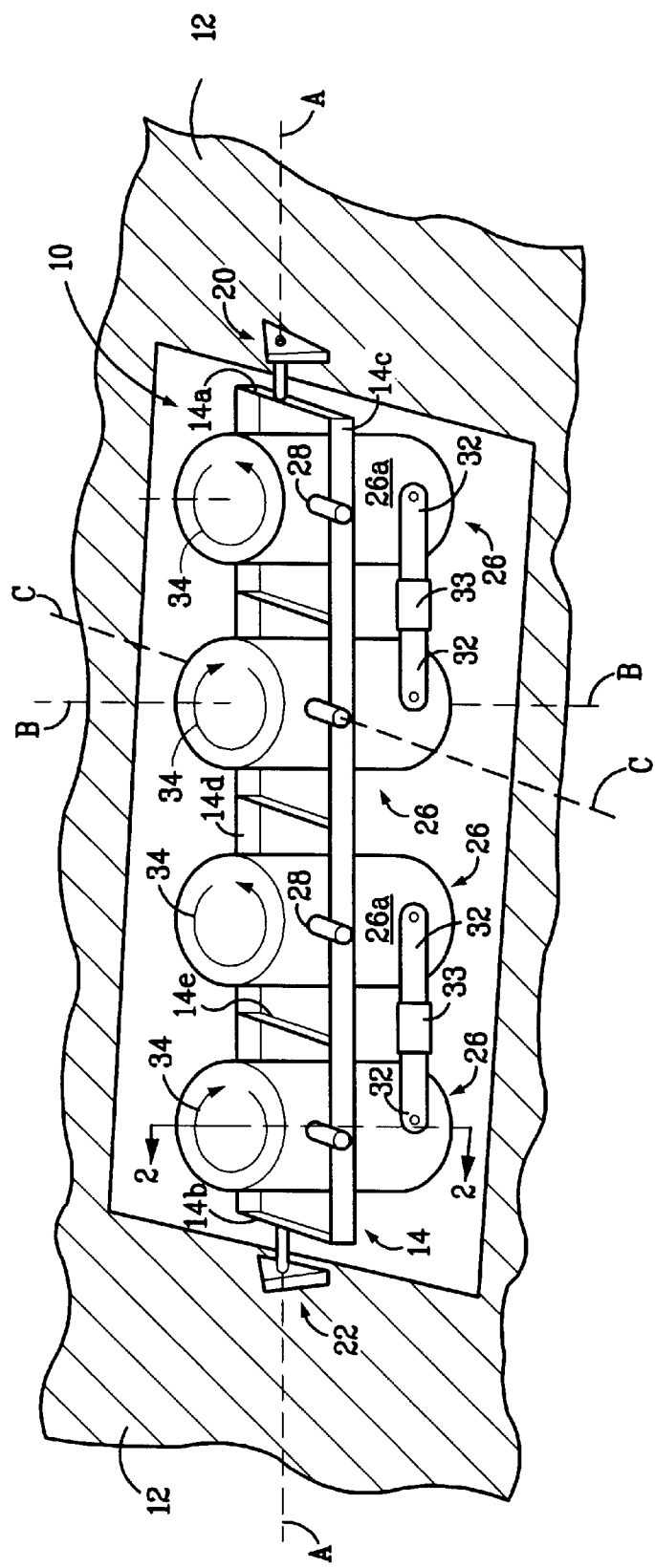
Figure 2:
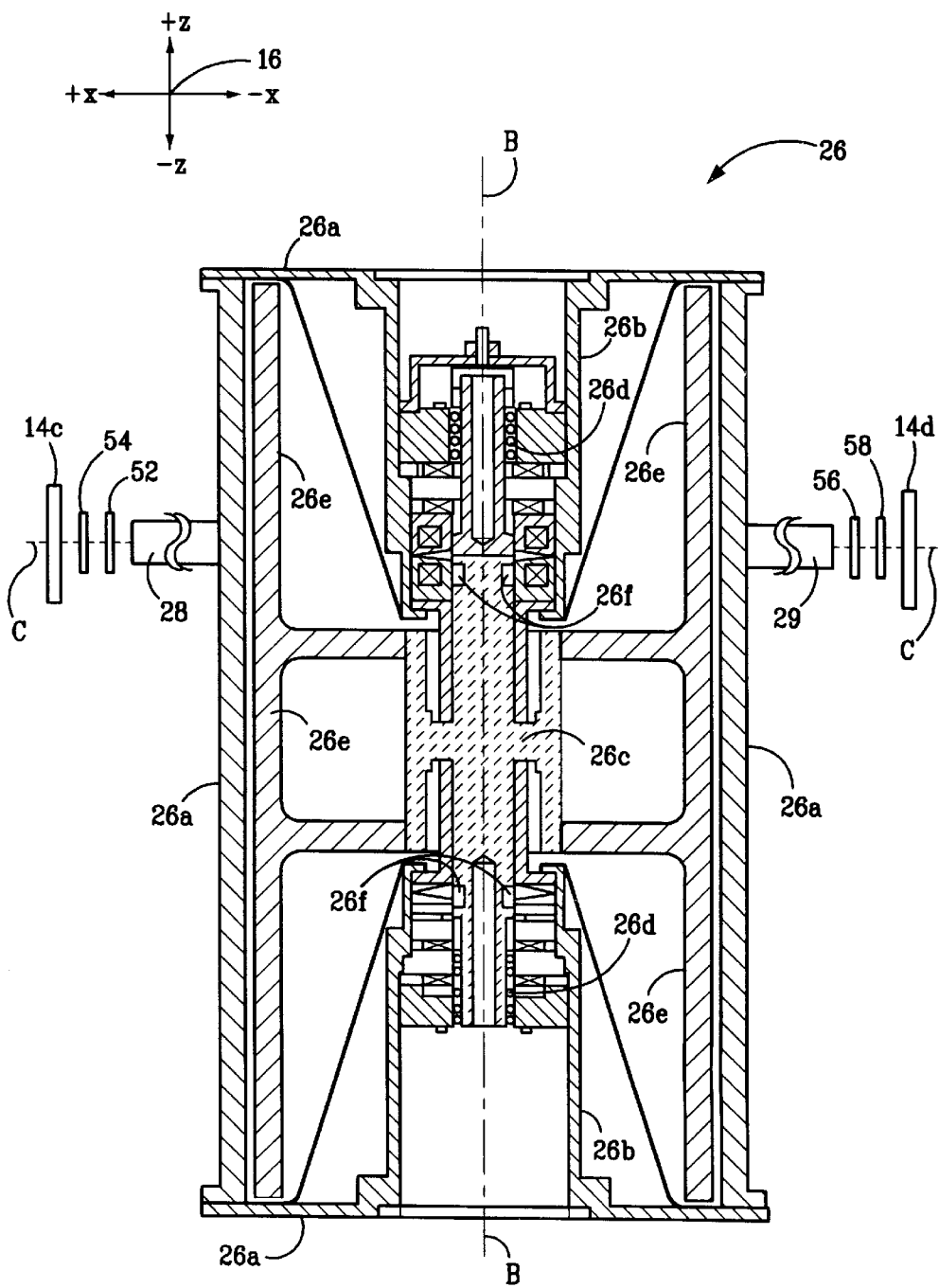
FIG. 2 is a partially-exploded, cross-sectional view of a flywheel unit of the gimbaled flywheel system shown in FIG. 1, taken through the line 2–2 of FIG. 1.
Figure 3:
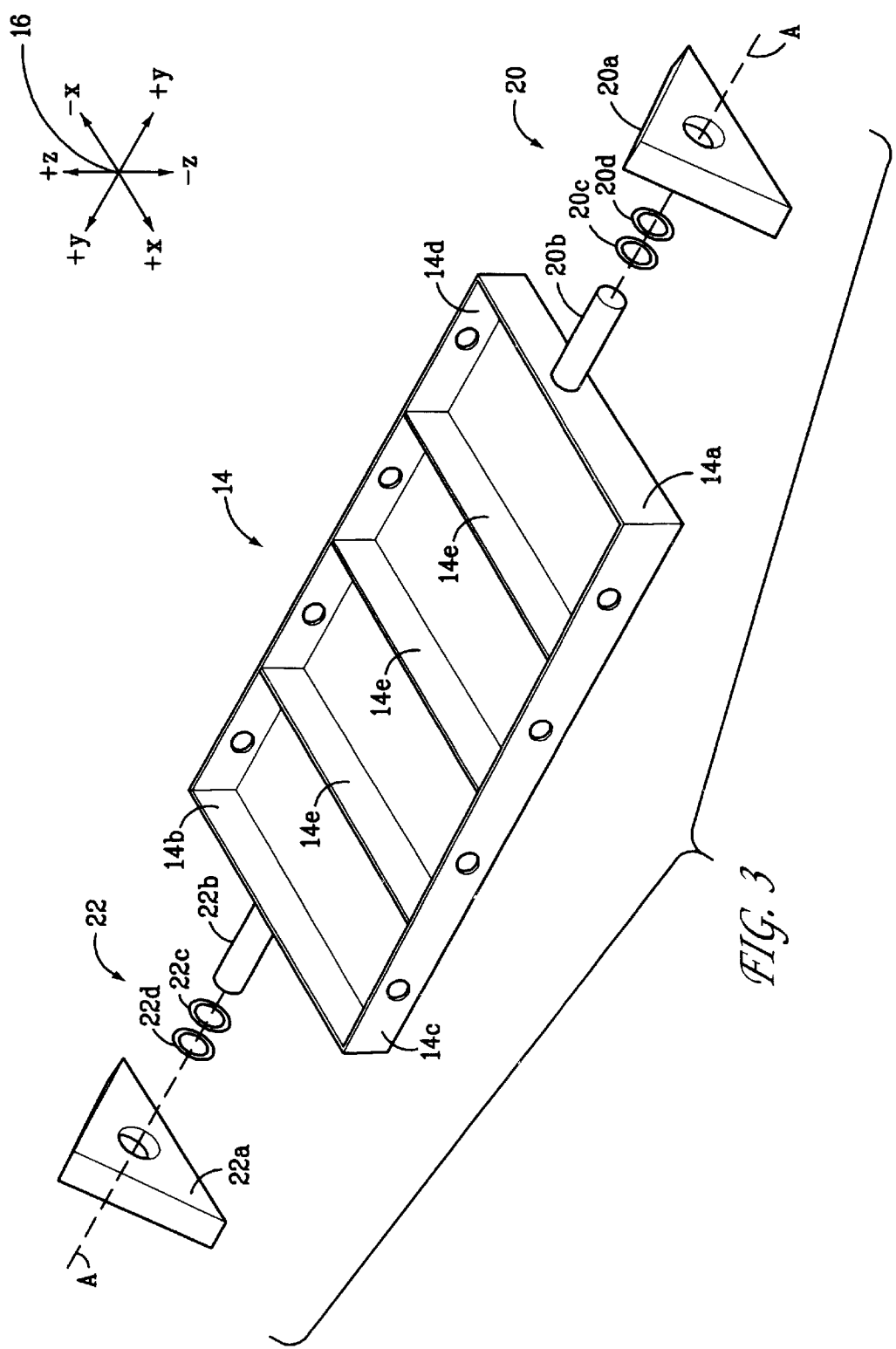
FIG. 3 is a partially-exploded, perspective view a mounting frame and pivots of the gimbaled flywheel system shown in FIG. 1.

FIGS. 1–3 depict a presently-preferred embodiment of a gimbaled flywheel system 10 in accordance with the present invention. The gimbaled flywheel system 10 can be used in conjunction with a mobile vehicle, e.g., an automobile, having a mounting or support surface 12 for supporting the gimbaled flywheel system 10. This particular application is described for illustrative purposes only, as the gimbaled flywheel system 10 can be used with virtually any type of mobile vehicle. The gimbaled flywheel system 10 can also be utilized in non-mobile applications where it is necessary or desirable to partially isolate multiple flywheel units from a mounting or supporting surface. Note: The mounting surface 12 is depicted in FIG. 1 for illustrative purposes only. The gimbaled flywheel system 10 can be mounted on or suspended from virtually any rigid or semi-rigid surface or support.

The gimbaled flywheel system 10 comprises a substantially rigid mounting frame 14 having a first frame member 14a and an opposing second frame member 14b. The first and the second frame members 14a, 14b each extend substantially in a lateral ("x") direction, as shown in FIGS. 1 and 3. Note: Each of the figures is referenced to a common coordinate system 16 depicted therein. In addition, the gimbaled flywheel system 10, unless otherwise noted, is described herein with reference to the component orientations shown in FIG. 1, i.e., with the gimbaled flywheel system 10 in a substantially level orientation with respect to the mounting surface 12.

The mounting frame 14 also includes a third frame member 14c and an opposing fourth frame member 14d each extending substantially in a longitudinal ("y") direction. Opposing ends of the third frame member 14c are fixedly coupled to the first frame member 14a and the second frame member 14b. Opposing ends of the fourth frame member 14d are fixedly coupled to the first frame member 14a and the second frame member 14b. The mounting frame 14 further comprises a plurality of cross braces 14e fixedly coupled to the third frame member 14c and the fourth frame member 14d, and extending substantially in the lateral direction.

The gimbaled flywheel system 10 further comprises a first pivot 20 and a second pivot 22 (see FIGS. 1 and 3). The first and the second pivots 20. 22 permit the mounting frame 14 to rotate or pivot about a first axis extending substantially in the longitudinal direction (the pivotal axis of the mounting frame 14 is denoted by the symbol "A" included in FIG. 1 and 3). The first pivot 20 includes a mount 20a, a pin member 20b, a bearing 20c, and a rotational damper 20d. The mount 20a is adapted to be fixedly coupled to the mounting surface 12 by conventional means such as fasteners. A first end of the pin member 20b is fixedly coupled to the first frame member 14a. The pin member 20b extends from the first frame member 14a substantially in the longitudinal direction. An opposing second end of the pin member 20b is rotatably coupled to the mount 20a via the bearing 20c and the rotational damper 20d. The bearing 20c is preferably a thrust bearing of conventional design that restrains the pin member 20a axially, i.e. in the "y" direction, as well as radially.

The second pivot 22 includes a mount 22a, a pin member 22b, a bearing 20c, and a rotational damper 20d. The mount 22a is adapted to be fixedly coupled to the mounting surface 12. A first end of the pin member 22b is fixedly coupled to the second frame member 14b. The pin member 22b extends from the second frame member 14b substantially in the longitudinal direction. An opposing second end of the pin member 22b is rotatably coupled to the mount 22a via the bearing 22c and the rotational damper 22d. The bearing 22c is substantially identical to the bearing 20c in the exemplary gimbaled flywheel system 10. Alternatively, the bearing 22c may be a roller bearing that provides only radial restraint to the pin member 22a, i.e., axial restraint of the mounting frame 14 can be provided solely by the bearing 20c in alternative embodiments of the invention. Alternative embodiments may forgo the use of the rotational damper 22d, i.e., rotational damping of the mounting frame 14 can be provided solely by the rotational damper 20d.

The gimbaled flywheel system 10 further comprises a plurality of flywheel units 26 pivotally suspended from the mounting frame 14. The presently-preferred embodiment described herein comprises four of the flywheel units 26. This particular configuration is described for illustrative purposes only, as the invention can be used in conjunction with flywheel systems comprising virtually any even number of the flywheel units 26.

Each flywheel unit 26 comprises a casing 26a and a stator 26b fixedly coupled to the casing 26a, as shown in FIG. 2. The flywheel unit 26 further comprises a shaft 26c rotatably coupled to the stator 26b via bearings 26d, and a rotatable flywheel 26e fixedly coupled to the shaft 26c. The flywheel 26e has an axis of rotation that extends substantially in the vertical ("z") direction when the gimbaled flywheel system 10 is oriented as shown in FIG. 1, i.e., with the gimbaled flywheel system 10 is in a substantially level orientation with respect to the mounting surface 12. (The axis of rotation of one of the flywheels 26d is denoted by the symbol "B" in FIGS. 1 and 2). Each flywheel unit 26 also comprises magnets 26f fixed to the shaft 26c.

The flywheel units 26 function as electromechanical batteries. More particularly, each flywheel unit 26 converts electrical energy into mechanical energy, and stores the mechanical energy in the flywheel 26d. This is accomplished by energizing windings on the stator 26b. The resulting electrical field interacts with the magnets 26f and thereby generates a rotational force that acts on the shaft 26c. This force imparts rotational motion to the shaft 26c and the flywheel 26e, thereby energizing the flywheel 26e.

The flywheel unit 26 subsequently converts the mechanical energy stored in the flywheel 26d back into electrical energy. More particularly, the momentum of the rotating flywheel 26e imparts rotational motion to the shaft 26c and the magnets 26f when the windings of the stator 26b are deenergized. The magnetic field generated by the magnets 26f interacts with the stationary windings, and thereby induces an electrical current in the windings. Note: The flywheel units 26 are described in detail herein for illustrative purposes only, as the invention can be used in conjunction with virtually any type of flywheel apparatus.

Each flywheel unit 26 is adapted to pivot about a respective axis extending substantially in the lateral direction. (The pivotal axis of one of the flywheel units 26 is denoted by the symbol "C" in FIGS. 1 and 2.) The flywheel units 26 are each suspended from a first pivot pin 28 and a second pivot pin 29 fixedly coupled to opposing sides of the casing 26a. The first and second pivot pins 28, 29 extend substantially in the lateral ("x") direction when the gimbaled flywheel system 10 is oriented as shown in FIG. 1. (The pivot pins 28, 29 are thus substantially parallel to the first and the second frame members 14a, 14b.) The pivot pins 28, 29 are fixed to the casing 26a of each respective flywheel unit 26 at locations above the center of gravity of the flywheel unit 26 (from the perspective of FIG. 1). The significance of this feature is explained below.

An end of each pivot pin 28 is rotatably coupled to the third frame member 14c via a bearing 52 and a rotational damper 54 (see FIG. 2). The bearing 52 is preferably a thrust bearing of conventional design that restrains the respective pivot pin 28 axially, i.e., in the "x" direction, as well as radially.

An end of each pivot pin 29 is rotatably coupled to the fourth frame member 14d via a thrust bearing 56 and a rotational damper 58. The bearing 56 is substantially identical to the bearing 50 in the exemplary gimbaled flywheel system 10. Alternatively, the bearing 56 may be a roller bearing that provides only radial restraint to the respective pivot pin 29, i.e., axial restraint of the flywheel units 26 can be provided solely by the bearings 52 in alternative embodiments of the invention. Alternative embodiments may forgo the use of the rotational damper 58, i.e., rotational damping of the flywheel units 26 can be provided solely by the rotational damper 52.

The gimbaled flywheel system 10 further comprises a plurality of torque links 32 (see FIG. 1). Opposing ends of each torque link 32 are pivotally coupled to the casings 26a of adjacent flywheel units 26 by conventional means such as pins. Each torque link 32 has an axial damper 33 incorporated therein. The functions of the torque links 32 and axial dampers 33 are discussed below.

Operational details concerning the gimbaled flywheel system 10 are as follows. The gimbaled flywheel system 10 partially isolates the flywheel units 26 from angular displacement of the mounting surface 12. (Such displacement can occur, for example, when a vehicle in which the gimbaled flywheel system 10 is mounted turns, climbs, or otherwise changes its orientation in relation to the ground.) More particularly, the gimbaled flywheel system 10 permits each flywheel unit 26 to move with two degrees of freedom in relation to the surface 14. This feature minimizes the generation of gyroscopic moments within the flywheel units 26 when the mounting surface 12 undergoes angular displacement about the "x" or "y" axes denoted on the coordinate system 16, for the following reasons.

The flywheel 26e of each flywheel unit 26 rotates about a respective axis extending substantially in the vertical ("z") direction when the gimbaled flywheel system 10 and the mounting surface 12 are positioned as shown in FIG. 1, as noted previously. Hence, angular displacement of the flywheel unit 26 about an axis extending in the "x" or "y" directions, if allowed to occur, will induce gyroscopic moments in the flywheel unit 26.

Each flywheel unit 26 is suspended from the mounting frame 14 in a manner that permits the flywheel unit 26 to pivot about a respective axis extending substantially in the "x" direction, as noted above. This feature substantially isolates the flywheel units 26 from angular displacement of the mounting surface 12 about the "x" axis.

The mounting frame 14 is suspended from the pivots 20, 22 in a manner that permits the mounting frame 14 to pivot about an axis extending substantially in the "y" direction, as noted above. This feature substantially isolates the flywheel units 26 from angular displacement of the mounting surface 12 about the "y" axis.

The center of gravity of each flywheel unit 26 is located below the respective pivotal axis the flywheel unit 26, as noted previously. This feature, combined with the ability of each flywheel unit 26 to pivot about axes extending substantially in the "x" and "y" directions, cause the flywheel units 26 to remain substantially in "upright," i.e., in the position shown in FIG. 1, when the mounting surface 12 undergoes angular displacement about the "x" or "y" axes. The mounting frame 14 and the pivots 20, 22 thus function as a common gimbaled mount for all of the flywheel units 26. The substantial advantages associated with this arrangement are discussed below.

Friction within the bearings 20c, 22c, 50, 56, and the damping effect of the rotational dampers 20d, 22d, 52, 58 can generate relatively small gyroscopic moments in the flywheel units 26 when the mounting surface 12 undergoes angular displacement about the "x" or "y" axes. The gimbaled flywheel system 10 is configured to substantially eliminate the effects of these moments. This is accomplished by rotating the flywheels 26e of adjacent flywheel units 26 in opposing directions, and at substantially identical speeds (the direction of rotation of each flywheel 26e is denoted by arrows 34 included in FIG. 1).

Flywheels such as the flywheels 26e rotating in opposite directions at substantially identical speeds are subject to opposing gyroscopic moments of substantially equal magnitude. The opposing gyroscopic moments acting on adjacent flywheel units 26 about the pivotal axis of the mounting frame 14, i.e., about an axis extending substantially in the "y" direction, are transmitted to the mounting frame 14, where the moments substantially cancel. The opposing gyroscopic moments acting on adjacent flywheel units 26 about their respective pivotal axes are transmitted between the adjacent flywheel units 26 via the torque link 32, thereby canceling those moments. In addition, the axial dampers 33 incorporated into each torque link 32 dampen relative rotational movement between the adjacent flywheel units 26.

The mounting frame 14 and the pivots 20, 22 function as a common gimbaled mount for all of the flywheel units 26, as noted above. The gimbaled flywheel system 10 therefore provides the benefits of a gimbaled mounting arrangement, while avoiding many of the disadvantages associated with the use of multiple gimbaled mounts. For example, the use of a gimbaled mounting arrangement minimizes the stresses experienced by the bearings 26d when the mounting surface 12 undergoes angular displacement. Hence, the loading, friction, and wear experienced by the bearings 26d are relatively low. Reducing the loading, friction, and wear of a bearing generally leads to longer bearing life, and increases the effective energy-storage capacity of the flywheel unit in which the bearing is used. Furthermore, bearings subjected to relatively low loads are usually lighter, smaller, less complex, and less costly the highly-loaded bearings.

The gimbaled flywheel system 10 facilitates a gimbaled mounting arrangement of multiple flywheel units 26 using only two mounts, e.g., the mounts 20a, 22a of the first and second pivots 20, 22, and a relatively simple, low-cost frame, e.g., the mounting frame 14. Conventional gimbaled mounting arrangements generally require one pair of mounts for each individual flywheel unit. Hence, the gimbaled flywheel system 10 is lighter, more compact, and less complex than a conventional gimbaled mounting arrangement for a comparable number of flywheel units (these characteristics are of particular value in mobile installations). Furthermore, the parts count (and, in particular, the number of moving parts) of the gimbaled flywheel system 10 is low in relation to conventional gimbaled mounting arrangements. Hence, the gimbaled flywheel system 10 is potentially less expensive to manufacture, more reliable, and easier to maintain than a conventional gimbaled mounting arrangement for a comparable number of flywheel units.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention.

What is claimed is:

1. A gimbaled flywheel system for use on a supporting surface, comprising:
   a pivot for mounting on the supporting surface;
   a mounting frame comprising a first frame member coupled to the pivot and extending in a first direction, and a second frame member fixedly coupled to the first frame member and extending in a second direction substantially perpendicular to the first direction, the mounting frame being pivotable about an axis extending substantially in the second direction when the pivot is mounted on the supporting surface; and
   a plurality of flywheel units each comprising a casing pivotally coupled to the second frame member and being pivotable about a respective axis extending substantially in the first direction, a flywheel rotatably coupled to the casing and being rotatable about a respective axis extending substantially in a third direction, the third direction being substantially perpendicular to the first direction, and a pivot pin extending from the casing of the respective flywheel unit and being pivotally coupled to the second frame member, and
   a plurality of rotational dampers, wherein the pivot pins are pivotally coupled to the second frame member via the rotational dampers.

2. The gimbaled flywheel system of claim 1, further comprising a third frame member fixedly coupled to the second frame member and extending substantially in the first direction, a second pivot coupled to the third frame member and adapted to be coupled to the supporting surface, and a fourth frame member fixedly coupled to the first and the third frame members, pivotally coupled to the casing of each of the flywheel units, and extending substantially in the second direction.

3. The gimbaled flywheel system of claim 1, wherein the flywheels of adjacent ones of the plurality of flywheel units are rotatable in opposing directions.

4. The gimbaled flywheel system of claim 1, further comprising a torque link pivotally coupled to the casings of adjacent ones of the plurality of flywheel units.

5. The gimbaled flywheel system of claim 1, further comprising a fifth frame member fixedly coupled the second and the fourth frame members and extending substantially in the first direction.

6. The gimbaled flywheel system of claim 1, further comprising a plurality of bearings, wherein the pivot pins are pivotally coupled to the second frame member via the plurality of bearings.

7. The gimbaled flywheel system of claim 1, wherein the pivot comprises a mount adapted to be fixedly coupled to the supporting surface, and a pin member fixedly coupled to the first member, extending from the first member substantially in the second direction, and being rotatably coupled to the mount.

8. The gimbaled flywheel system of claim 7, wherein the pivot further comprises a bearing, the pin member being rotatably coupled to the mount via the bearing.

9. The gimbaled flywheel system of claim ,7 wherein the pivot further comprises a rotational damper, the pin member being rotatably coupled to the mount via the rotational damper.

10. The gimbaled flywheel system of claim 1, wherein a center of gravity of each of the flywheel units is located below the respective axis extending substantially in the first direction.

11. The gimbaled flywheel system of claim 2, further comprising a fifth frame member fixedly coupled to the second and the fourth frame members and being positioned between adjacent ones of the flywheel units.

12. The gimbaled flywheel system of claim 4, wherein the torque link comprises an axial damper.

13. A power-storage system, comprising:
    a first and a second pivot for being fixedly coupled to a mounting surface;
    a mounting frame comprising a first frame member coupled to the first pivot, an opposing second frame member coupled to the second pivot, and a third and an opposing fourth frame member each being fixedly coupled to the first and the second frame members, the mounting frame being pivotable about an axis extending in a first direction; and
    a plurality of flywheel units each comprising a casing pivotally coupled to the third and the fourth frame members and being pivotable about a respective axis extending substantially in a second direction, a flywheel rotatably coupled to the casing and being rotatable about an axis extending substantially in a third direction, a first and a second pivot pin extending from the casing of the respective flywheel unit and being pivotally coupled to the third and the fourth frame members respectively; and
    a plurality of rotational dampers, wherein each of the first pivot pins is pivotally coupled to the third frame member via one of the plurality of rotational dampers.

14. The power-storage system of claim 13, wherein the third direction is substantially perpendicular to the second direction.

15. The power-storage system of claim 13, wherein the first, the second, and the third directions are substantially mutually perpendicular.

16. The power-storage system of claim 13, wherein the flywheels of adjacent ones of the plurality of flywheel units are rotatable in opposing directions.

17. The power-storage system of claim 13, further comprising a torque link pivotally coupled to the casings of adjacent ones of the plurality of flywheel units.

18. The power-storage system of claim 13, wherein:
    the first pivot comprises a first mount adapted to be fixedly coupled to the mounting surface, and a first pin member having a first end fixedly coupled to the first frame member and a second end rotatably coupled to the first mount; and the second pivot comprises a second mount adapted to be fixedly coupled to the mounting surface, and a second pin member having a first end fixedly coupled to the second frame member and a second end rotatably coupled to the first mount.

19. The power-storage system of claim 18, wherein:

the first pivot further comprises a first bearing, the second end of the first pin member being rotatably coupled to the first mount via the first bearing; and the second pivot further comprises a second bearing, the second end of the second pin member being rotatably coupled to the second mount via the second bearing.

20. The power-storage system of claim 19, wherein the first and the second bearings are thrust bearings.

21. The power-storage system of claim 19, wherein the first pivot further comprises a first rotational damper, the second end of the first pin member being rotatably coupled to the first mount via the first rotational damper.

22. The power-storage system of claim 13, further comprising a fifth frame member Fixedly coupled the third and the fourth frame members and extending substantially in the second direction.

23. The power-storage system of claim 13, further comprising a plurality of bearings, wherein each of the first and the second pivot pins is pivotally coupled to the respective third and fourth frame members via one of the plurality of bearings.

24. The power-storage system of claim 23, wherein each of the plurality of bearings is a thrust bearing.

25. The power-storage system of claim 17, wherein the torque link comprises an axial damper.

26. The power-storage system of claim 13, wherein each of the flywheel units further comprises a stator fixedly coupled to the casing, a bearing, and a shaft fixedly coupled the flywheel and rotatably coupled to the stator via the bearing.

27. A gimbaled flywheel system for use on a supporting surface, comprising:

a pivot comprising a mount for being fixedly coupled to the supporting surface, a pin member fixedly coupled to the first member, extending from the first member substantially in the second direction, and being rotatably coupled to the mount, and a rotational damper, the pin member being rotatably coupled to the mount via the rotational damper, a mounting frame comprising a first frame member coupled to the pivot and extending in a first direction, and a second frame member fixedly coupled to the first frame member and extending in a second direction substantially perpendicular to the first direction, the mounting frame being pivotable about an axis extending substantially in the second direction when the pivot is mounted on the supporting surface; and a plurality of flywheel units each comprising a casing pivotally coupled to the second frame member and being pivotable about a respective axis extending substantially in the first direction, and a flywheel rotatably coupled to the casing and being rotatable about a respective axis extending substantially in a third direction, the third direction being substantially perpendicular to the first direction.

28. A gimbaled flywheel system for use on a supporting surface, comprising;

a pivot for being mounted on the supporting surface, a mounting frame comprising a first frame member coupled to the pivot and extending in a first direction, and a second frame member fixedly coupled to the first frame member and extending in a second direction substantially perpendicular to the first direction, the mounting frame being pivotable about an axis extending substantially in the second direction when the pivot is mounted on the supporting surface; and a plurality of flywheel units each comprising a casing pivotally coupled to the second frame member and being pivotable about a respective axis extending substantially in the first direction, and a flywheel rotatably coupled to the casing and being rotatable about a respective axis extending substantially in a third direction, the third direction being substantially perpendicular to the first direction, wherein a center of gravity of each of the flywheel units is located below the respective axis extending substantially in the first direction.

29. A power-storage system, comprising:

a first and a second pivot for being fixedly coupled to a mounting surface, the first pivot comprising (i) a first mount for being fixedly coupled to the mounting surface, (ii) a first pin member having a first end fixedly coupled to the first frame member and a second end rotatably coupled to the first mount, (iii) a first bearing, the second end of the first pin member being rotatably coupled to the first mount via the first bearing, and (iv) a first rotational damper, the second end of the first pin member being rotatably coupled to the first mount via the first rotational damper, the second pivot comprising (i) a second mount for being fixedly coupled to the mounting surface, (ii) a second pin member having a first end fixedly coupled to the second frame member and a second end rotatably coupled to the second mount, and (iii) a second bearing, the second end of the second pin member being rotatably coupled to the second mount via the second bearing;

a mounting frame comprising a first frame member coupled to the first pivot, an opposing second frame member coupled to the second pivot, and a third and an opposing fourth frame member each being fixedly coupled to the first and the second frame members, the mounting frame being pivotable about an axis extending in a first direction; and a plurality of flywheel units each comprising a casing pivotally coupled to the third and the fourth frame members and being pivotable about a respective axis extending substantially in a second direction, and a flywheel rotatably coupled to the casing and being rotatable about an axis extending substantially in a third direction.

* * * * *